W. M. ST. ELMO.
COUPLING FOR CONNECTING PIPES AND FAUCETS TO RECEPTACLES.
APPLICATION FILED MAR. 4, 1915.
1,169,691. Patented Jan. 25, 1916.
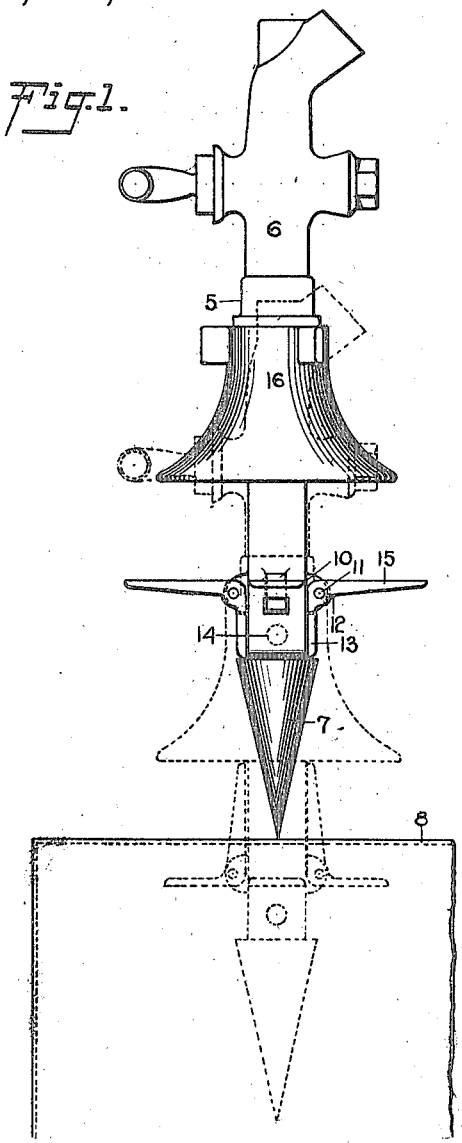
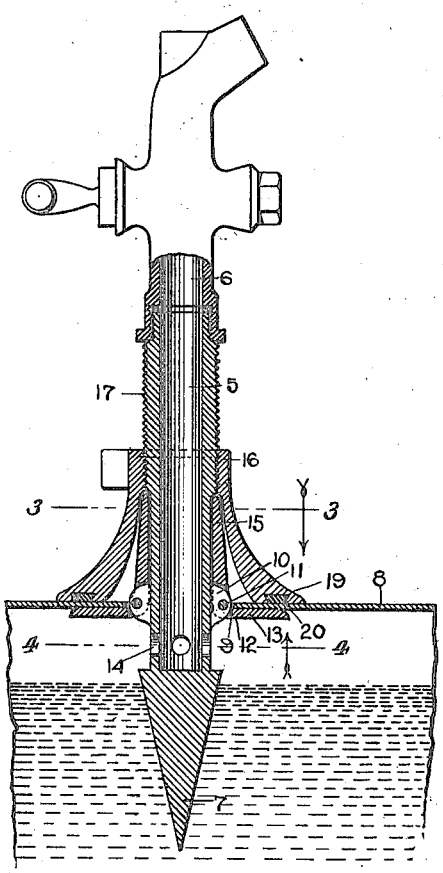
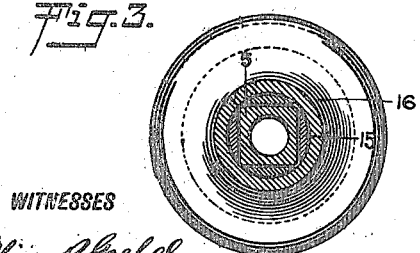
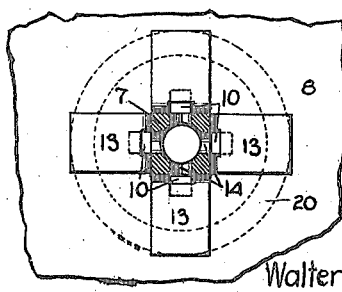
WITNESSES
INVENTOR
Walter M. St. Elmo
BY
ATTORNEYS

UNITED STATES PATENT OFFICE.

WALTER M. ST. ELMO, OF SAN JUAN, PORTO RICO.

COUPLING FOR CONNECTING PIPES AND FAUCETS TO RECEPTACLES.

1,169,691.   Specification of Letters Patent.   Patented Jan. 25, 1916.

Application filed March 4, 1915. Serial No. 12,212.

*To all whom it may concern:*

Be it known that I, WALTER M. ST. ELMO, a citizen of the United States, and a resident of San Juan, Porto Rico, have invented a new and Improved Coupling for Connecting Pipes and Faucets to Receptacles, of which the following is a full, clear, and exact description.

My invention has for its object to provide a coupling having means for penetrating a receptacle and for connecting a pipe therewith around the opening made in the receptacle.

The coupling is constructed with a hollow shank having a point at its end for penetrating the receptacle, there being a plurality of levers fulcrumed around the shank, arms of which close the openings in the sides of the shank when the shank is pushed through the opening in the receptacle, the other arms of the levers being adapted to be engaged by a nut meshing with a thread on the shank for holding the first mentioned arms of the levers against the inner side of the receptacle while the nut having a gasket, is turned home against the outer side of the receptacle.

Additional objects of the invention will appear in the following specification in which the preferred form of my invention is disclosed.

In the drawings similar reference characters refer to similar parts in all the views in which—

Figure 1 is a side elevation of my invention; Fig. 2 is a view similar to that shown in Fig. 1, but in section and illustrating the manner in which the coupling is secured to the receptacle; Fig. 3 is a sectional view on the line 3—3 of Fig. 2; and Fig. 4 is a sectional view on the line 4—4 of Fig. 3.

By referring to the drawings it will be seen that a hollow shank 5 is provided, to one end of which a faucet 6 may be secured. The other end of the hollow shank 5 has a point 7 for penetrating a receptacle 8. In Fig. 2 of the drawings, an opening 9 is shown, which has been made by the pointed end 7 of the shank. At the sides of the shank 5 there are lugs 10 to which are fulcrumed at 11, bell crank levers 12, these bell crank levers 12 having arms 13 which are adapted to close the openings 14 in the sides of the shank 5, adjacent the pointed end 7 when the arms 13 are disposed parallel with the side of the shank 5 as illustrated in Fig. 1 of the drawings. When the arms 13 of the bell crank levers 12 are disposed in this position, the pointed end 7 of the shank 5 is forced through the receptacle 8, forming the opening 9, the arms 13 of the bell crank levers 12 being disposed within the receptacle. The other set of arms 15 of the bell crank levers 12 are moved from the position shown by the full lines in Fig. 1 of the drawings to the position shown in Fig. 2 of the drawings, when the arms 13 will be disposed against the inner side of the receptacle 8. The nut 16 which meshes with the outer thread 17 on the shank 5 is then turned relatively to the shank for receiving the arms 15 of the bell crank levers in the annular opening 18 in the nut 16. This serves to hold the bell crank levers 12 in the position indicated in Fig. 2 of the drawings while the nut 16 is turned home against the outer side of the receptacle 8. It will be noticed that there is an annular recess 19 in the nut 16 for receiving a gasket 20, which, when pressed against the receptacle 8, prevents any leakage between the receptacle 8 and the nut 16.

Having thus described my invention I claim as new and desire to secure by Letters Patent:

1. In a coupling of the class described, a hollow shank having at one end a point, the base of which is greater in diameter than the top of the shank, there being an opening through the side of the shank adjacent the said base, a plurality of bell crank levers pivoted at the outside of the shank and disposed therearound, one set of arms of the bell crank levers being adapted to be disposed against the shank and within the plane at the sides of the base, and a member disposed around the shank for movement longitudinally thereof, the inner sides of the member diverging in the general direction of the bell crank levers and being adapted to engage one set of arms of the bell crank levers for pressing them against the hollow shank for the purpose specified.

2. In a coupling of the class described, a hollow shank pointed at one end with an opening through the side of the shank adjacent the said end, a plurality of bell crank levers pivoted at the outer side of the shank and disposed therearound, and a member disposed around the shank for moving longitudinally thereof, the inner sides of the member diverging in the general direction of the bell crank levers and being adapted to engage one set of arms of the bell crank levers for pressing them against the hollow shank, there being an annular recess in the outer face of the member, and a gasket in the annular recess for engaging the side of a receptacle around an opening made by the pointed end of the shank.

3. In a coupling of the class described, a hollow shank pointed at one end with an opening through one side of the shank adjacent the said end, a plurality of bell crank levers fulcrumed outside of and around the shank, and a member disposed around the shank for engaging one set of arms of the bell crank levers and for pressing against one side of a receptacle, and with the other set of arms of the bell crank levers in engagement with the other side of the receptacle.

4. In a coupling of the class described, a hollow shank having at one end a point the base of which is greater in diameter than the shank, a plurality of bell crank levers disposed at the outer side of the shank and pivoted thereto, one set of arms of the bell crank levers being adapted to be disposed against the shank and within the planes of the sides of the base and a member on the shank for engaging the other set of arms of the levers for holding them adjacent the shank.

5. In a coupling of the class described, a hollow shank having an outer thread, there being an opening through the side of the shank, a lever fulcrumed to the side of the shank and having an arm adapted to close the opening and to move to a position at an angle to the shank for engaging the inner side of a receptacle, and a nut meshing with the thread on the shank and having an opening for receiving the other arm of the lever when the nut is turned home against the outer side of the receptacle.

6. In a coupling of the class described, a hollow shank, there being an opening through the side of the shank, a lever fulcrumed to the side of the shank and having an arm adapted to close the opening and to move to a position at an angle to the shank for engaging the inner side of a receptacle, and a member disposed around the shank and having an opening for receiving the other arm of the lever when the member is pressed against the outer side of the receptacle.

7. In a coupling of the class described, a hollow shank with an opening through the side thereof, a lever fulcrumed to the side of the shank and adapted to close the opening, and means for holding the lever against the inner side of a receptacle when the shank is disposed in an opening in the receptacle.

8. In a coupling of the class described, a hollow shank with an opening through the side thereof, a lever fulcrumed to the side of the shank and adapted to close the opening, and means for moving the lever away from the opening when the shank is disposed in an opening in a receptacle.

In testimony whereof I have signed my name to this specification in the presence of the two subscribing witnesses.

WALTER M. ST. ELMO.

Witnesses:
 EVERARD B. MARSHALL,
 PHILIP D. ROLLHAUS.